US011074515B2

(12) United States Patent
Ganjoo

(10) Patent No.: US 11,074,515 B2
(45) Date of Patent: Jul. 27, 2021

(54) QUERY AND RANKING PREDICTION USING NETWORK ACTION

(71) Applicant: Microsoft Technology Licensing, LLC, Redmond, WA (US)

(72) Inventor: Afshin Ganjoo, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 553 days.

(21) Appl. No.: 15/444,824

(22) Filed: Feb. 28, 2017

(65) Prior Publication Data

US 2018/0247213 A1 Aug. 30, 2018

(51) Int. Cl.

| | |
|---|---|
| ***G06N 7/00*** | (2006.01) |
| ***G06F 9/451*** | (2018.01) |
| ***G06F 16/2457*** | (2019.01) |
| ***G06N 5/02*** | (2006.01) |
| ***G06Q 10/00*** | (2012.01) |

(52) U.S. Cl.

CPC ............. *G06N 7/005* (2013.01); *G06F 9/452* (2018.02); *G06F 16/24578* (2019.01); *G06N 5/022* (2013.01); *G06Q 10/00* (2013.01)

(58) Field of Classification Search

CPC .... G06N 7/005; G06F 9/452; G06F 16/24578

See application file for complete search history.

(56) References Cited

U.S. PATENT DOCUMENTS 8,386,300 B2 * 2/2013 April ...................... G06Q 10/06 705/7.36
2012/0016710 A1 * 1/2012 Santos ................. G06Q 10/105 705/7.22
2012/0226623 A1 * 9/2012 Jurney .................. G06Q 50/01 705/321
2013/0325734 A1 * 12/2013 Bixler ............... G06Q 10/1053 705/321

(Continued)

FOREIGN PATENT DOCUMENTS

WO 2018160224 A1 9/2018

OTHER PUBLICATIONS

Paparrizos, "Machine learning Job Recommendation", 2011 (Year: 2011).*

(Continued)

*Primary Examiner* — Ann J Lo
*Assistant Examiner* — Van C Mang
(74) *Attorney, Agent, or Firm* — Schwegman Lundberg & Woessner, P.A.

(57) ABSTRACT

Described are methods and systems to identify analyzing a social network to predict member actions, queries, or ranks within a social networking system. According to various embodiments, the system detects changes within a first data set of a first member. The system identifies an entity associated with the change in the first data set, determines an action probability of the entity in response to the change, and identifies a second data set associated with a second member having at least one common element with the first data set.

(Continued)

300

DETECTING A CHANGE IN A FIRST DATA SET IN A SOCIAL NETWORKING SYSTEM FROM A FIRST EMPLOYMENT STATUS TO A SECOND EMPLOYMENT STATUS (310)

IDENTIFYING AN ENTITY ASSOCIATED WITH THE FIRST EMPLOYMENT STATUS (320)

DETERMINING AN ACTION PROBABILITY OF THE ENTITY IN RESPONSE TO THE CHANGE IN EMPLOYMENT STATUS (330)

IDENTIFYING A SECOND DATA SET ASSOCIATED WITH A SECOND MEMBER HAVING AT LEAST ONE COMMON ELEMENT WITH THE FIRST DATA SET (340)

IDENTIFYING A SET OF ELEMENTS WITHIN THE FIRST DATA SET AND AN ENTITY DATA SET CORRESPONDING TO THE FIRST EMPLOYMENT STATUS (350)

GENERATING A CUSTOMIZED USER INTERFACE SCREEN COMPRISING A REPRESENTATION OF THE ENTITY AND A PORTION OF THE SET OF ELEMENTS (360)

The system identifies a set of elements in the first data set and an entity data set corresponding to the change and generates a customized user interface screen comprising a representation of the entity and a portion of the set of elements.

20 Claims, 9 Drawing Sheets

(56) References Cited

U.S. PATENT DOCUMENTS

2014/0214943 A1* 7/2014 Shapero .............. H04L 12/1895
709/204

OTHER PUBLICATIONS

Yuan, "Promotion and resignation in employee networks", 2015 (Year: 2015).*

"International Application Serial No. PCT/US2017/054417, International Search Report dated Dec. 15, 2017", 2 pgs.

"International Application Serial No. PCT/US2017/054417, Written Opinion dated Dec. 15, 2017", 4 pgs.

"International Preliminary Report on Patentability Issued in PCT Application No. PCT/US2017/054417", dated Sep. 12, 2019, 6 Pages.

* cited by examiner 908
902
PROCESSOR
INSTRUCTIONS
926
904
MAIN MEMORY
INSTRUCTIONS
926
906
STATIC MEMORY
920
NETWORK INTERFACE DEVICE
NETWORK
928
BUS
910
DISPLAY
912
INPUT DEVICE
914
USER INTERFACE NAVIGATION (CURSOR CONTROL) DEVICE
916
STORAGE DEVICE
924
MACHINE READABLE MEDIUM
926
INSTRUCTIONS
918
SIGNAL GENERATION DEVICE
922
SENSOR
900

QUERY AND RANKING PREDICTION USING NETWORK ACTION

TECHNICAL HELD

Embodiments of the present disclosure relate generally to the technical field of query prediction and ranking. Specifically, the present disclosure describes systems and methods to automatically predict queries and rankings using one or more network actions.

BACKGROUND

Network-based publication systems enable users to publish documents, pages, and other content. Users may access and view published content on the network-based publication system via a network linking the network-based publication system to a client device. A social networking system allows members to declare information about themselves, such as their professional qualifications or skills. In addition to information the members declare about themselves, a social networking system may gather and track information pertaining to behaviors of members with respect to the social networking system and social networks of members of the social networking system. Analyzing a vast array of such information may help to formulate solutions to various problems that may not otherwise have clear solutions.

BRIEF DESCRIPTION OF THE SEVERAL VIEWS OF THE DRAWINGS

Some embodiments are illustrated by way of example and not limitation in the accompanying drawings, in which.

DETAILED DESCRIPTION

Figure 1:
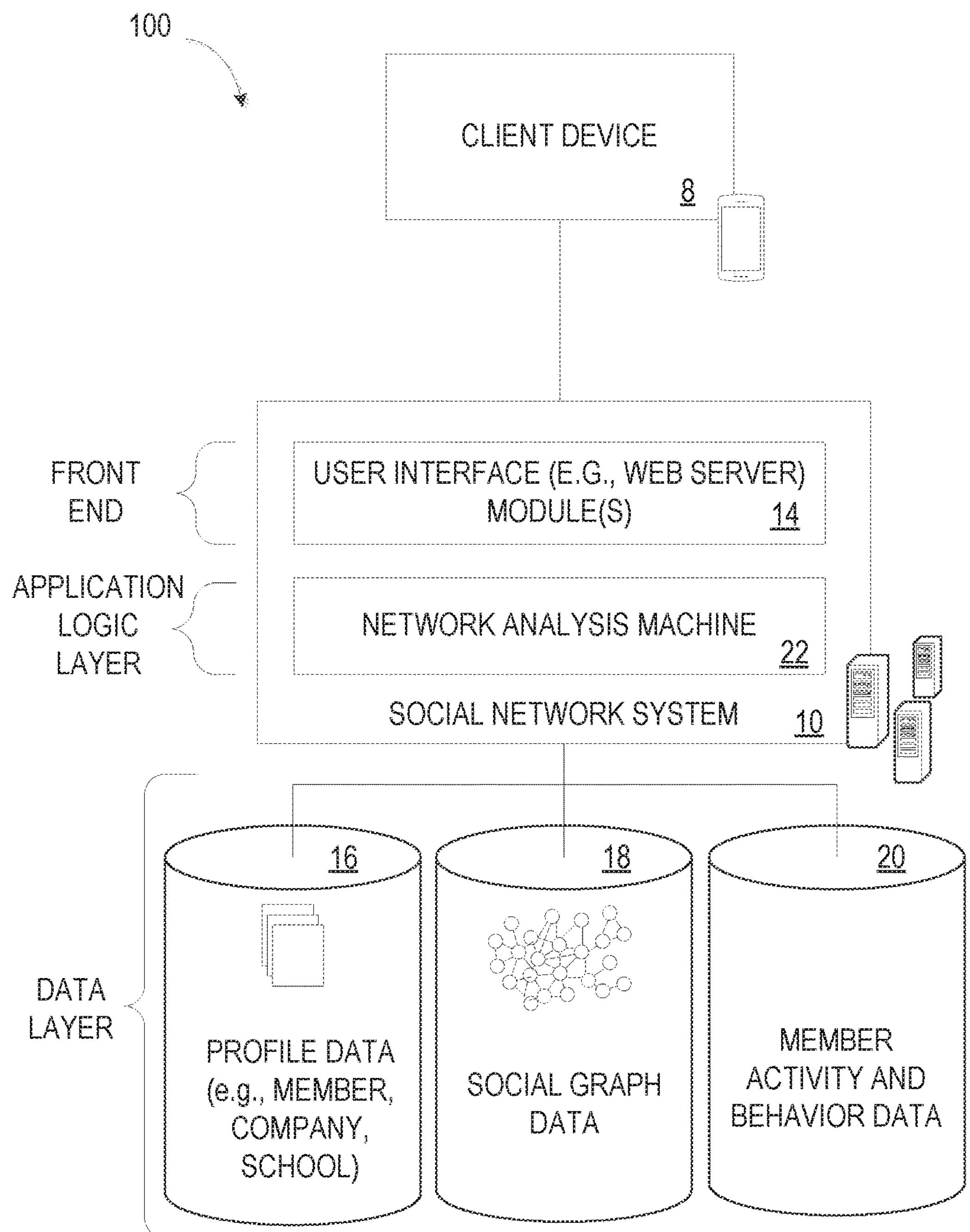
FIG. 1 is a block diagram of the functional components that comprise a computer- or network-based social networking system, including a network analysis machine, consistent with some embodiments described herein.

Example methods and systems are shown for analyzing a social network to predict queries, rankings, and other actions on data sets within a networked system. In some embodiments, the methods and systems described herein enable analysis of a social network to predict member actions within the social networking system. In some example embodiments, a first member of a social network logs one or more changes to a data set (e.g., a member profile) in a social networking system. The one or more changes may correspond to a specified element or element type, such as a job or employment status. A network analysis machine identifies the change and performs predictive analysis on entities associated with the change.

Upon generating a prediction of an action of the entity associated with the change, the network analysis machine generates predictions for one or more members of the social networking system indicating a likelihood of taking action or responding to the subject of the prediction. For example, the first member may make changes in an employment status within a first member profile. The network analysis machine generates predictions indicating a likelihood that an entity associated with the employment change (e.g., an employer) will generate a job opening to fill a job vacancy resulting from the employment status change. The network analysis machine identifies another member of the social network positioned to fill the predicted job vacancy, predicts a likelihood that the member will apply to the predicted job vacancy, and notifies the member of the predicted job vacancy. In some embodiments, the network analysis machine identifies and provides to the member identifying or contact information of another member of the social networking system in a position to recommend or otherwise connect the member to the entity and the job vacancy.

Social networking systems provide various profile options and services. In some instances, a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system, companies maintaining a social networking presence on the social networking system, and interactions between members, companies, and content provided by both the members and companies to the social networking system. As will be discussed in more detail below, information pertaining to members of the social networking system can include data items pertaining to education, work experience, skills, reputation, certifications, and other qualifications of each of the members of the social networking system at particular points during the careers of these members, or interaction data indicating a history of interactions with content on the social networking system. This information pertaining to members of the social networking system may be member-generated to enable individualization of social networking profiles as well as to enable dynamic and organic expansion and discovery of fields of experience, education, skills, and other information relating to personal and professional experiences of members of the social networking system.

Other aspects of the present inventive subject matter will be readily apparent from the description of the figures that follow.

FIG. 1 is a block diagram 100 of the functional components that comprise a computer or network-based social networking system 10, consistent with some embodiments of the inventive concepts of the present disclosure. In some embodiments, the social networking system 10 acts as a network-based publication system. In these instances, as shown in FIG. 1, the social networking system 10 is generally based on a three-tiered architecture, comprising a front end layer, application logic layer, and data layer. As is understood by skilled artisans in the relevant computer and Internet-related arts, each component or engine shown in FIG. 1 represents a set of executable software instructions (e.g., an instruction set executable by a processor) and the corresponding hardware (e.g., memory and processor) for executing the instructions. To avoid obscuring the inventive subject matter, various functional components and engines that are not germane to conveying an understanding of the inventive subject matter have been omitted from FIG. 1. However, a skilled artisan will readily recognize that various additional functional components and engines may be used with a social networking system 10, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social networking system 10 is depicted in FIG. 1 as having a three-tiered architecture, the inventive subject matter is by no means limited to such architecture.

As shown in FIG. 1, the front end comprises a user interface component 14 (e.g., a web server), which receives requests from various client devices 8, and communicates appropriate responses to the requesting client devices 8. For example, the user interface component 14 may receive requests in the form of Hypertext Transfer Protocol (HTTP) requests or other web-based application programming interface (API) requests. The client devices 8 may be executing conventional web browser applications or applications that have been developed for a specific platform to include any of a wide variety of mobile devices and operating systems.

As shown in FIG. 1, the data layer includes several databases, including one or more databases 16 for storing data relating to various entities represented in a social graph. In some embodiments, these entities include members, companies, and/or educational institutions, among possible others. Consistent with some embodiments, when a person initially registers to become a member of the social networking service, and at various times subsequent to initially registering, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, and so on. This information is stored as part of a member's member profile, for example, in the database 16. In some embodiments, a member's profile data will include not only the explicitly provided data, but also any number of derived or computed member profile attributes and/or characteristics.

Once registered, a member may invite other members, or be invited by other members, to connect via the social networking service. A "connection" may mean a bilateral agreement by the members, such that both members acknowledge the establishment of the connection. Similarly, in some embodiments, a member may elect to "follow" another member. In contrast to establishing a "connection," the concept of "following" another member typically is a unilateral operation and, at least in some embodiments, does not include acknowledgement or approval by the member who is being followed. When one member follows another, the member who is following may receive automatic notifications about various activities undertaken by the member being followed. In addition to following another member, a member may elect to follow a company, a topic, a conversation, or some other entity. In general, the associations and relationships that a member has with other members and other entities (e.g., companies, schools, etc.) become part of the social graph data maintained in a database 18. In some embodiments, a social graph data structure may be implemented with a graph database (e.g., the database 18), which is a particular type of database that uses graph structures with nodes, edges, and properties to represent and store data. In this case, the social graph data stored in the database 18 reflects the various entities that are part of the social graph, as well as how those entities are related with one another.

In various alternative embodiments, any number of other entities might be included in the social graph and, as such, various other databases may be used to store data corresponding with the other entities. For example, although not shown in FIG. 1, consistent with some embodiments, the social networking system 10 may include additional databases for storing information relating to a wide variety of entities, such as information concerning various online or offline groups, job listings or postings, photographs, audio or video files, and so forth.

In some embodiments, the social networking service may include one or more activity and/or event-tracking components, which generally detect various member-related activities and/or events, and then store information relating to those activities/events in a database 20. For example, the tracking components may identify when a member makes a change to some attribute of his or her member profile or adds a new attribute. Additionally, a tracking component may detect the interactions that a member has with different types of content. Such information may be used, for example, by one or more recommendation engines to tailor the content presented to a particular member, and generally to tailor the member experience for a particular member.

The application logic layer includes various application server components, which, in conjunction with the user interface component 14, generate various user interfaces (e.g., web pages) with data retrieved from various data sources in the data layer. In some embodiments, individual application server components are used to implement the functionality associated with various applications, services, and features of the social networking service. For instance, a messaging application, such as an email application, an instant messaging application, a social networking application native to a mobile device, a social networking application installed on a mobile device, or some hybrid or variation of these, may be implemented with one or more application server components implemented as a combination of hardware and software elements. Of course, other applications or services may be separately embodied in their own application server components.

As shown in FIG. 1, a network analysis machine 22 is an example application server component of the social networking system 10. The network analysis machine 22 performs operations to automatically analyze a social network to predict changes to queries, rankings, and actions within a member profile and entities or companies associated with the changes. In some embodiments, the network analysis machine 22 operates in conjunction with the user interface components 14 to receive sets of publication data, sets of member data, and member input to generate tailored user interface presentations including tailored member search results indicating comparisons between career paths of members and predicted job openings generated by entities in response to changes in employment status within a member profile. For example, the network analysis machine 22 may render graphical representations of predicted job openings and potential members or member connections by which a member may for a connection to the entity with the job opening and increase a likelihood of obtaining the job.

The social networking system 10 may provide a broad range of applications and services that allow members the opportunity to share and receive information, often customized to the interests of the member. For example, in some embodiments, the social networking system 10 may include a photo sharing application that allows members to upload and share photos with other members, or a slide sharing application, which allows members to upload slide decks for sharing among other members. In some embodiments, members of the social networking system 10 may be able to self-organize into groups, or interest groups, organized around a subject or topic of interest. Accordingly, the data for a group may be stored in a database (not shown). When a member joins a group, his or her membership in the group will be reflected in the social graph data stored in the database 18. In some embodiments, members may subscribe to or join groups affiliated with one or more companies. For instance, in some embodiments, members of the social networking system 10 may indicate an affiliation with a company at which they are employed, such that news and events pertaining to the company are automatically communicated to the members. In some embodiments, members may be allowed to subscribe to receive information concerning companies other than the company with which they are employed. Here again, membership in a group, a subscription or following relationship with a company or group, and an employment relationship with a company are all examples of the different types of relationships that may exist between different entities, as defined by the social graph and modeled with the social graph data of the database 18.

Figure 2:
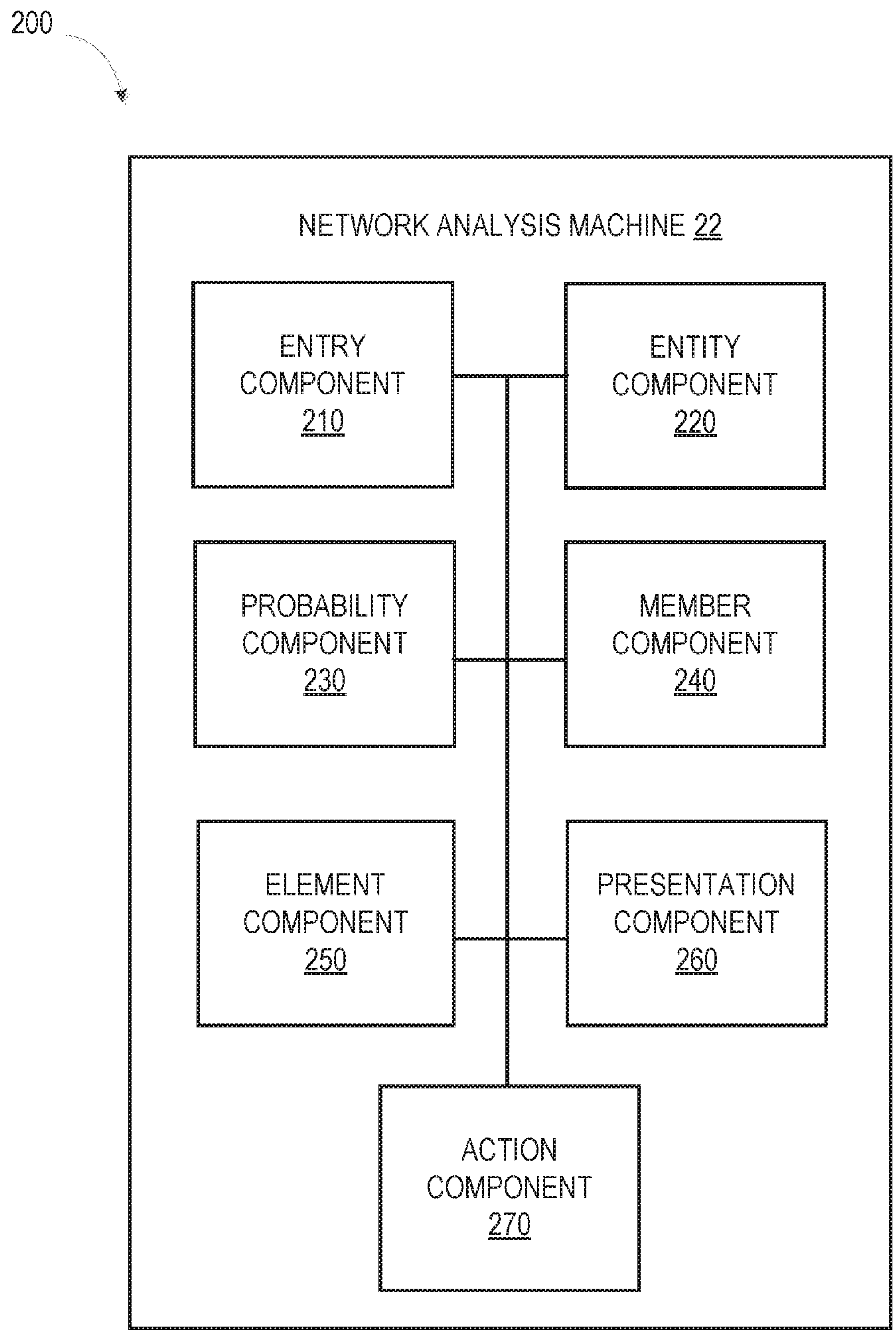
FIG. 2 is a block diagram depicting components of the network analysis machine of FIG. 1, in accordance with an example embodiment.

FIG. 2 is a block diagram 200 depicting some example components of the network analysis machine 22 of FIG. 1. The network analysis machine 22 is shown including an entry component 210, an entity component 220, a probability component 230, a member component 240, an element component 250, a presentation component 260, and an action component 270, all configured to communicate with each other (e.g., via a bus, shared memory, a switch, or a network). Any one or more of the components described herein may be implemented using hardware (e.g., one or more processors specifically configured to perform the operations described herein) or a combination of hardware and software, forming a hardware-software implemented component. For example, any component described herein may configure a processor (e.g., among one or more processors of a machine) as a special-purpose machine, during the pendency of a set of operations, to perform the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

The entry component 210 detects changes in a first data set (e.g., a first member profile) in the social networking system 10. In some example embodiments, the entry component 210 accesses the data sets by accessing one or more databases of the social networking system 10. For example, the entry component 210 may access the database 16 including profile data for members and entities interacting with the social networking system 10. The entry component 210 may access the first data set via a network connection to the social networking system 10, via a direct connection to a database of the social networking system 10, using internal interactions between components of the social networking system 10, or any other suitable manner.

The entity component 220 identifies entities associated with the first employment status changed in the first data set. In some embodiments, the entity component 220 identifies the entities by parsing the first data set using one or more of semantic analysis, accessing and parsing associated data structures (e.g., a data table), or any other suitable manner. The entity component 220 may differentiate between two or more entities associated with the employment status change to identify the entity which serves as the employer for a first employment status, and entities described in the first data set without an employer/employee relationship to the member associated with the first data set.

The probability component 230 determines probabilities for actions, queries, rankings, and member connections or comparisons within the social networking system 10. In some embodiments, the probability component 230 determines action probabilities of an entity within the social networking system 10 performing an action in response to changes in the employment status identified in the first data set. The probability component 230 may determine employment probabilities representing a likelihood of specified causes of modifications in the employment status. In some instances, the probability component 230 determines opening probabilities representing a likelihood of a job opening resulting from the change in employment status. The probability component 230 may also determine replacement probabilities representing a likelihood of a response type with respect to modification of the employment status. The response types comprise filling a vacancy opened by the change in employment status, promoting another member, or filling a vacancy with a member associated with the entity.

The member component 240 identifies members associated with differing data sets in response to one or more of the probabilities determined by the probability component 230. The member component 240 may identify data sets and members by comparing elements within data sets (e.g., member profiles), entity data sets (e.g., entity profiles), or other suitable data. In some embodiments, the member component 240 identifies the member likely to be interested in a job vacancy opened by the change in employment status of the first data set.

The element component 250 identifies a set of elements within an entity data set associated with the entity. The sets of elements correspond to the first employment status. In some embodiments, the element component 250 identifies one or more elements representing skills, traits, characteristics, education, qualifications, or other portions of the entity data set indicating aspects of a candidate member profile likely to receive positive attention when applying for a job vacancy opened by the change in the employment status of the first data set.

The presentation component 260 generates and causes presentation of customized user interface screens based on one or more values, probabilities of actions, probabilities of queries, or ranks determined by one or more components of the network analysis machine 22. In some embodiments, the presentation component 260 generates user interface screens comprising member contact information, information relating to potential or predicted job vacancies, and data set or member profile elements associated with increased probabilities of positive responses to applying for job vacancies.

The action component 270 identifies actions associated with one or more data sets of the social networking system 10. In some embodiments, the action component 270 identifies actions associated with a second data set indicating historical actions of a second member. The historical actions may be processed and incorporated into probability calculations to indicate a relative likelihood of the second member being interested in or applying for the predicted job vacancy.

Figure 3:
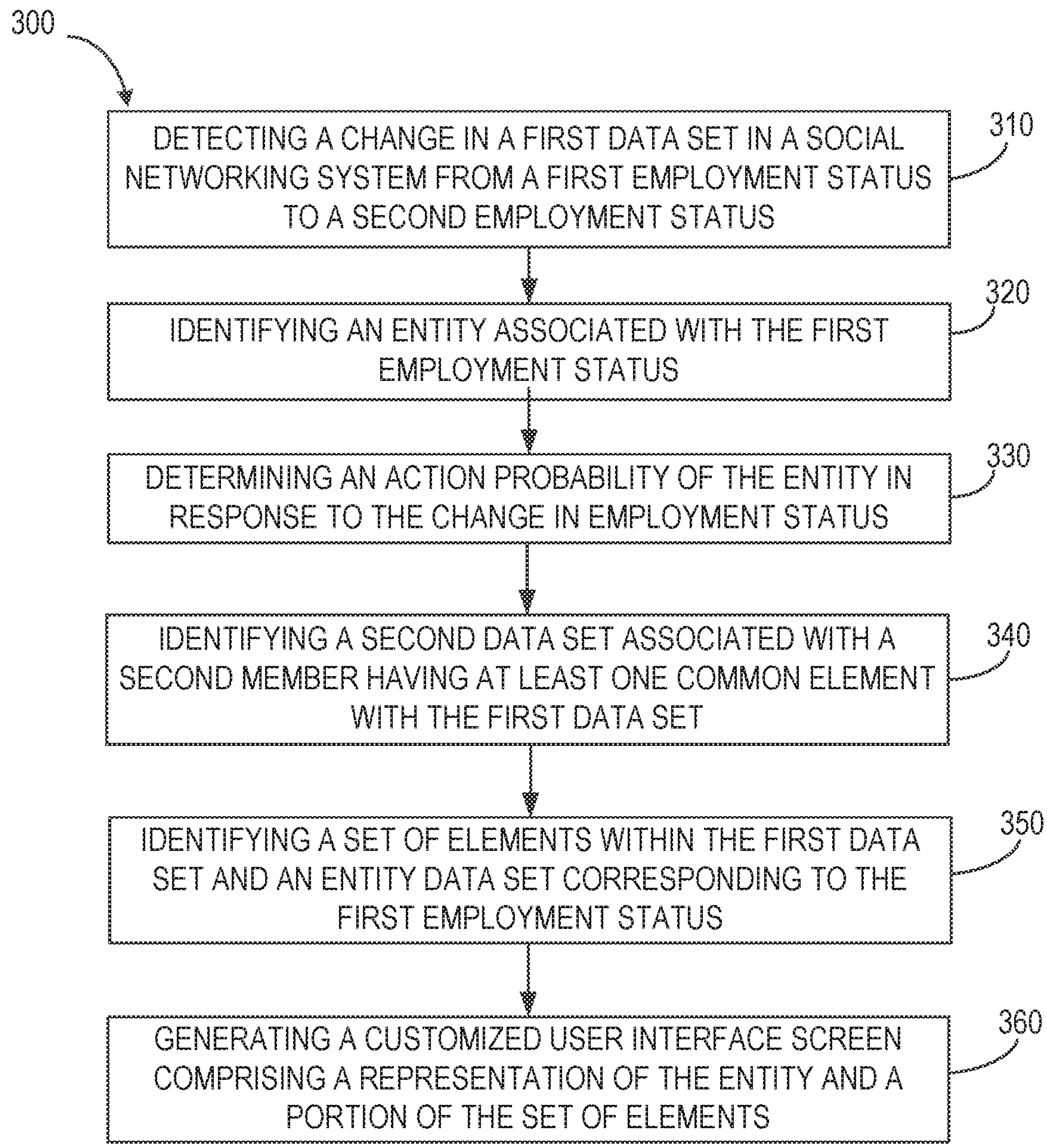
FIG. 3 is a flow diagram illustrating a method of analyzing a social network to predict member actions within the social networking system, according to some embodiments of the present disclosure.

FIG. 3 is a flow diagram illustrating an example method 300 of analyzing a social network to predict member actions within the social networking system 10, consistent with various embodiments described herein. For example, the method 300 may comprise analyzing the social network and predicting a probability of an entity generating a job opening in response to a first member of the social networking system 10 changing an employment status and a probability of a second member of the social networking system 10 being interested in the prospective job opening. The method 300 may be performed, at least in part, by, for example, the network analysis machine 22 illustrated in FIG. 2 (or an apparatus having similar components or operative programming, such as one or more client machines or application servers).

In operation 310, the entry component 210 detects a change in a first data set in the social networking system 10. In some embodiments, the first data set is a first member profile associated with a first member of the social networking system 10. The change in the first data set comprises a modification of an employment status of a first member associated with the first data set from a first employment status to a second employment status. In some embodiments, the entry component 210 detects the change in the first data set by accessing one or more data sets within the social networking system 10. The entry component 210 may periodically (e.g., at predetermined periods of time) access the one or more data sets, comparing the one or more data sets with previously saved iterations to determine changes within at least one data set (e.g., the first data set) of the one or more data sets. In some instances, the entry component 210 detects the change in the first data set by automatically receiving a change indicator. The change indicator may be automatically generated by one or more components of the social networking system 10 in response to the first member logging a change to the first data set within the social networking system 10. For example, in embodiments where the first data set is a first member profile, the first member may log into the first member profile. The first member enters an editing mode configured to enable modification of the first member profile. The first member may enter a modification to an employment status (e.g., change dates of employment from current to a specified date) or enter a new employment status (e.g., insert a new employer) as the change in the first data set. Upon receiving the change in the first data set, one or more components of the social networking system 10 may generate a system interrupt logging the change and passing the change to the entry component 210.

In operation 320, the entity component 220 identifies an entity associated with the first employment status. In some embodiments, the entity component 220 identifies the entity by parsing the first data set (e.g., the first member profile of the first member). In parsing the first data set, the entity component 220 identifies the element within the first data set which received the change. The entity component 220 may identify the element using the change indicator, by comparing instances of the first data set, or any other suitable method. After identifying the element which received the change, the entity component 220 determines the entity associated with the element. In some instances, the entity component 220 determines the entity from an identification stored within a data table including the element. The identification may be stored in a portion of the data table so as to indicate an association between the identification and the element. In some embodiments, the entity component 220 determines the entity by identifying one or more proper nouns within the element that were changed. The entity component 220 compares the proper nouns to members of the social networking system 10 to identify a match. Once a match has been identified, the entity component 220 identifies the match as the entity associated with the first employment status.

In operation 330, the probability component 230 determines an action probability of the entity within the social networking system 10 in response to the change from the first employment status to the second employment status. Some embodiments of the probability component 230 determining the action probability are described below with respect to FIG. 4. In some instances, the probability component 230 determines the action probability by identifying a first value representing a number of new hires detected for a company made within a given period of time. The probability component 230 determines a second value representing a number of people detected as having left the company within the given period of time. The probability component 230 may then determine the action probability by dividing the first value by the second value to produce a probability value. Although described above using a specified calculation, it should be understood that the probability component 230 may determine the action probability using any of the methods or combination of the methods described herein or using any other suitable method, algorithm, or calculation. For example, in some embodiments, the probability component 230 incorporates one or more additional determinations of characteristics for calculating the action probability. In such embodiments, the probability component 230 may distinguish between numbers of people added to the company and a number of people leaving the company based on the location of the company's office or offices, title of the employee, seniority of the employee, or other suitable characteristics. In these instances, if a principle engineer in machine learning leaves a San Francisco office, the probability component 230 may determine values for people of a similar title, seniority, and expertise who have been hired or recently left. Further, the characteristics determined in response to the principle engineer may correspond to any office or location or be limited to the San Francisco office.

The action probability may indicate the probability that the entity will generate a job opening to fill a position vacated by the first member. The probability component 230 determines the action probability from one or more actions performed by the entity and one or more characteristics of the entity. The probability component 230 attempts to determine whether the entity has other job openings or is actively hiring and whether a layoff is happening at the entity. If the entity has other job openings, the probability component 230 may generate a prediction indicating the entity will generate a job opening. Where the entity is laying off employees, the probability component 230 may generate a prediction indicating the entity will not generate a job opening. In some embodiments, upon generating the prediction, the probability component 230 continuously monitors predictions and entity activities and characteristics to generate subsequent predictions. In some embodiments, the probability component 230 incorporates machine learning algorithms to modify and increase accuracy of subsequent predictions. The probability component 230 may iteratively modify the machine learning algorithms to model hiring habits of the entity and an industry of the entity based on the above-referenced actions and characteristics. In some embodiments, the probability component incorporates machine learning algorithms including one or more of back propagation, Bayesian Classification, Bayesian Classification using Neural networks, Deep Learning, Deep Learning Neural Networks, or any other suitable machine learning algorithm and combinations thereof.

In some instances, the probability component 230 identifies a member profile for the entity within the social networking system 10. The probability component 230 identifies one or more characteristics of the entity from the member profile associated with the entity. The one or more characteristics comprise a number of employees of the entity, an industry type of the entity, a duration of operations of the entity, and health indicators for the entity, where the health indicators represent a likely continued level of operations for the entity. The probability component 230 identifies a member history for the member profile of the entity. In some embodiments, the probability component 230 identifies the one or more actions within the member history indicating a potential of the entity generating a job opening to fill the vacated position. The one or more actions comprise generating previous job openings, closing previous job openings, indicating previous job openings as having been filled, increasing a number of employees over a period of time, and reducing a number of employees over a period of time. Although described with specific examples of actions within the member history, it should be understood that the probability component 230 may incorporate and analyze any number and suitable type of actions performed within the member history that may be used to indicate or determine a likelihood that the entity will generate a new job opening to fill the vacant position.

In some embodiments, the probability component 230 performs a probability analysis using the one or more characteristics and the one or more actions as input. In some embodiments, the probability component 230 converts the one or more characteristics and the one or more actions to a set of vector representations comprising numerical representations of the characteristics and the actions. The probability component 230 performs the probability analysis on the set of vector representations. The probability component 230 outputs one or more probability values indicating a likelihood of the entity performing a specified action (e.g., an action probability) such as generating a new job opening within the social networking system 10, generating a job opening outside of the social networking system 10, or allowing the vacant position to remain unfilled.

In operation 340, the member component 240 identifies a second data set associated with a second member of the social networking system 10. The second data set comprises at least one common element with the first data set. In some embodiments, the member component 240 performs operation 340 in response to receiving an action probability from the probability component 230 indicating the entity is likely to generate a job opening in response to change of the employment status in the first data set.

In some instances, the member component 240 identifies the second data set by identifying one or more elements of the first data set associated with the employment status. In some embodiments, the member component 240 performs a semantic analysis of the first data set (e.g., the member profile) to identify the one or more elements. The one or more elements comprise skills, experience, education, characteristics, biographical data, and demographic data. Although examples of the one or more elements have been provided, it should be understood that the one or more elements associated with the employment status may be any suitable information provided within the first data set the first member profile) which indicates one or more of qualifications, related experience, related education, or related skills likely to be sought by the entity in a future candidate for a job opening generated to fill the vacancy opened by the change in employment status.

Once the member component 240 identifies the one or more elements of the first data set, the member component 240 performs one or more searches on data sets (e.g., member profiles) of the social networking system 10. The member component 240 may search the data sets using individual elements of the one or more elements or combinations of the one or more elements. The member component 240 identifies one or more data sets containing at least a portion of the one or more elements of the first data set. In some embodiments, the member component 240 ranks the one or more data sets and selects the second data set from among the one or more identified data sets.

In operation 350, the element component 250 identifies a set of elements within an entity data set associated with the entity. The set of elements correspond to the first employment status. In some embodiments, the element component 250 identifies the set of elements by accessing one or more previous job postings for the entity corresponding to the first employment status. For example, the element component 250 may identify a previous job posting for the job of the first employment status generated by the entity. The element component 250 identifies one or more qualifications, skills, education, or other characteristics associated with the job. In some embodiments, one or more of the elements identified in operation 340 may match one or more elements of the set of elements within the entity data.

In operation 360, the presentation component 260 generates a customized user interface screen. The customized user interface screen comprises a representation of the entity and a portion of the set of elements. In some embodiments, the representation of the entity comprises one or more of an identification of the entity such as a company name, a contact name of a member of the social networking system 10, and contact information for the entity. The portion of the set of elements comprise elements, characteristics, or qualifications included in the set of elements within the entity data set but excluded from the one or more elements within the second data set. In some embodiments, the customized user interface screen also comprises an indication of a potential job opening. The indication of the potential job opening may include an indication of an expected time at which the job opening is likely to be generated and posted within the social networking system 10 or outside of the social networking system 10. The customized user interface screen may be presented within a graphical user interface presented or displayed at a user device associated with the second member.

Figure 4:
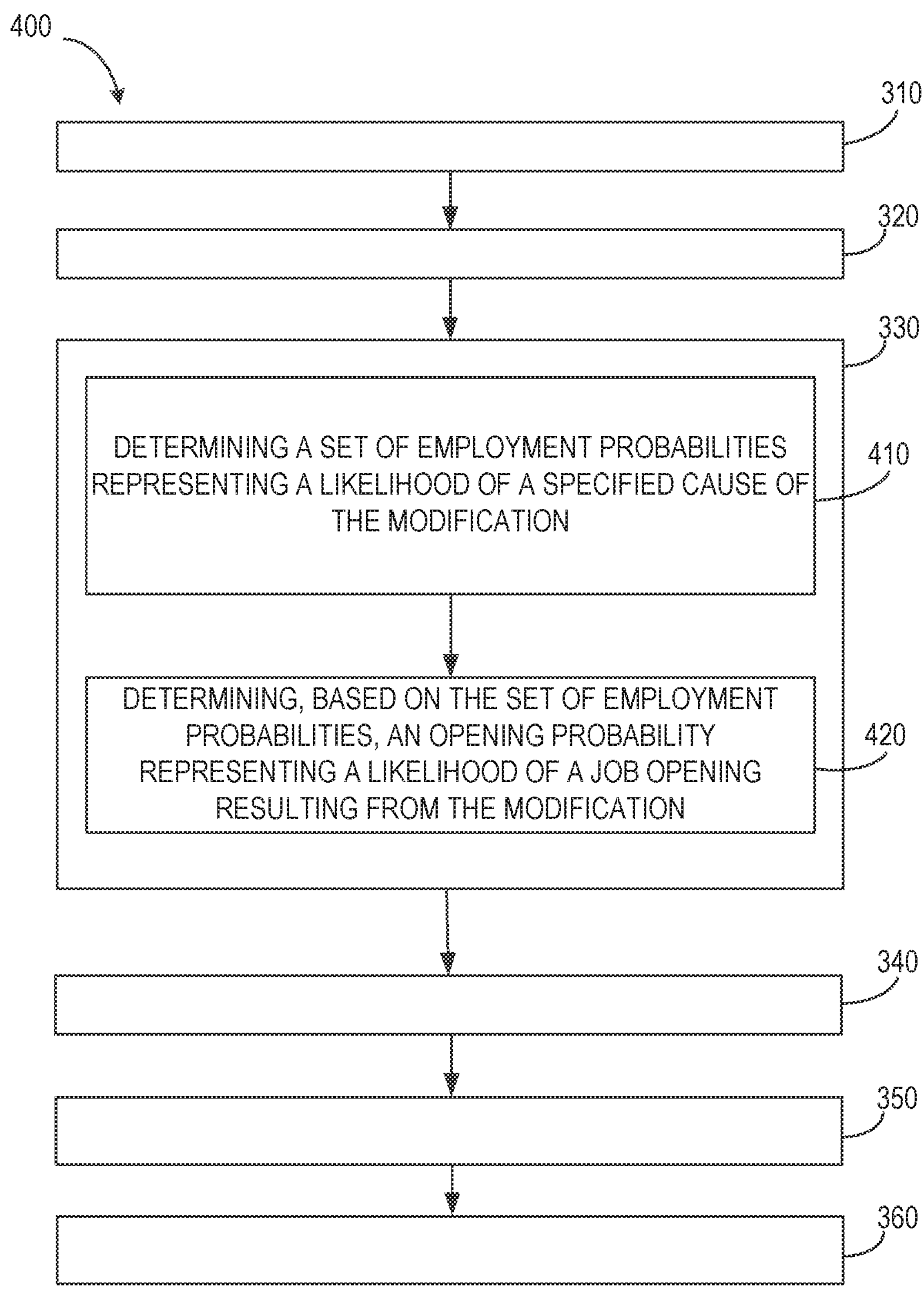
FIG. 4 is a flow diagram illustrating a method of analyzing a social network to predict member actions within the social networking system, according to some embodiments of the present disclosure.

FIG. 4 is a flow diagram illustrating a method 400 of analyzing a social network to predict member actions within the social networking system 10, consistent with various embodiments described herein. The method 400 may be performed, at least in part, by, for example, the network analysis machine 22 illustrated in FIG. 2 (or an apparatus having similar components, such as one or more client devices 8 or application servers). In some embodiments, the method 400 includes one or more operations from the method 300. In some instances, the method 400 is performed as a sub-operation or other part of operation 330.

In operation 410, the probability component 230 determines a set of employment probabilities. Each employment probability represents a likelihood of a specified cause of the modification of the employment status. In some embodiments, the set of employment probabilities comprises three probabilities. The first probability represents a likelihood that the first member left for a new employer. The second probability represents a likelihood that the first member left a current position for a new position within the company. The third probability represents a likelihood that the first member was promoted while remaining in the same or similar position within the entity.

The first probability is determined by the member adding a new company to the first data set (e.g., the first member profile), changing an entity email associated with the first data set, signing up for job recommendations within the social networking system 10, or receiving recommendations from colleagues. Receiving recommendations from colleagues may be preceded by the first member sending one or more requests for recommendations from colleagues or members associated with the first member. In some embodiments, the probability component 230 determines the first probability by parsing the data set in response to receiving an indication of the change from the entry component 210. After receiving the indication of the change, the probability component 230 determines whether a new entity (e.g., company or employer) has been added to the first data set, a new entity or company email address has been added, a job search has been performed by the first member, or recommendation requests have been transmitted or recommendations have been received and incorporated into the first data set. Each of the above-referenced factors may be converted into a numerical value and incorporated into a machine learning algorithm for probability analysis. In some embodiments, the probability component 230 generates a weight value for each factor identified within the first data set. The weight factor may be adjusted by the machine learning algorithm in response to an accuracy determination of a previous prediction by the probability component 230.

The second probability represents the likelihood that the first member left a current position for a new position within the company. In order to determine a value for the second probability, the probability component 230 determines whether a new position has been incorporated into the first data set as part of the change of employment status. Where the new position incorporates an identification of the entity associated with the first employment status, the probability component 230 associates the new position with the second probability. In some embodiments, the probability component 230 performs semantic analysis on the first data set to determine a position associated with the first employment status and the new position are functionally different. For example, the probability component 230 may use semantic analysis to determine job functions, job title, or other characteristics having a disparity score exceeding a predetermined value and indicating a functional and semantic difference between the previous position and the new position. The probability component 230 generates a second probability value indicative of the new position and the functional difference between the previous position and the new position within the same entity.

The third probability represents the likelihood that the first member was promoted while remaining in the same or similar position within the entity. In order to determine a value for the third probability, the probability component 230 determines whether a new position has been incorporated into the first data set with the same entity associated with the first employment status. The probability component 230 then identifies a first job title for a previous position associated with the first employment status and a second job title for the new position. The probability component 230 determines that the second job title is senior to the first job title. In some embodiments, the probability component 230 performs semantic analysis to determine the comparative seniority of the first job title and the second job title. The probability component 230 may perform a database search to determine the comparative seniority of the first and second job titles. In these instances, the probability component 230 may compare the first and second job titles to a hierarchical organization of job titles within the social networking system 10. Although described with respect to specified methods for determining comparative seniority between the first and second job titles, it should be understood that the probability component 230 may use any suitable method to determine the comparative seniority. Upon determining a seniority difference between the first and second job titles, the probability component 230 converts the difference into a numerical value for incorporation into a machine learning algorithm for determining a probability that the entity will generate an opening in response to the change in employment status.

In some embodiments, the probability component 230 determines the set of employment probabilities using a set of assumptions based on receiving a specified action indication a change of employment status. In such embodiments, the actions comprise adding a new position, adding a new position with a different company, adding a new position with a same company with a different job title, adding a new position with a same company using a similar job title. In instances where the member adds a new position, the probability component 230 identifies a probability that the company has a job opening. Where the member adds a new position with a different company, the probability component 230 identifies a probability that the member has left a company and the company now has an open position. Where the member adds or enters a new position with a same company as a previous position and includes a different job title, the probability component 230 identifies a probability that the company has an open position due to the member vacating a previous position for a new position. Where the member enters a new position with a same company and includes a similar job title, the probability component 230 identifies whether the change in job title is a promotion within a same field. Where the change in job title is not a promotion, the probability component 230 identifies a probability that no open position is available in the company.

In some embodiments, the probability component 230 differentiates between the member entering a position with a same company indicating an open position or no open position using one or more machine learning algorithms, as described herein. For example, a back propagation neural network may be trained to recognize promotions, indicating no open position, as distinct from a field change, a title change (e.g., a title change such as software engineer to manager), or a role change (e.g., a role change such as software engineer to product engineer), indicating an open position.

In operation 420, the probability component 230 determines an opening probability, based on the set of employment probabilities. The opening probability represents a likelihood of a job opening resulting from the modification of the employment status by the first member. The probability component 230 incorporates values generated for the first probability, the second probability, and the third probability into a machine learning algorithm. The machine learning algorithm outputs an opening probability value. Where the opening probability value exceeds an opening threshold, the probability component 230 determines the entity is likely to generate a job opening.

In some embodiments, the probability component 230 determines the opening probability using Equation 1:

$$P(\text{job})=\text{AVG}\ [xP(\text{new-company}),yP(\text{new-position}),zP(\text{promoted})]$$

As shown in Equation 1, x, y, and z are weight values applied by the probability component 230. In some embodiments, the weight values vary between one and negative one. The weight values may comprise initial values modified by the probability component 230. In some instances, the initial value of x is proximate to one, the initial value of z is proximate to negative one, and the initial value of y is positioned between zero and one. P(new-company) represents the first probability, P(new-position) represents the second probability, and P(promoted) represents the third probability. The probability component 230 may average the sum of the first, second, and third probabilities to determine the opening probability.

Figure 5:
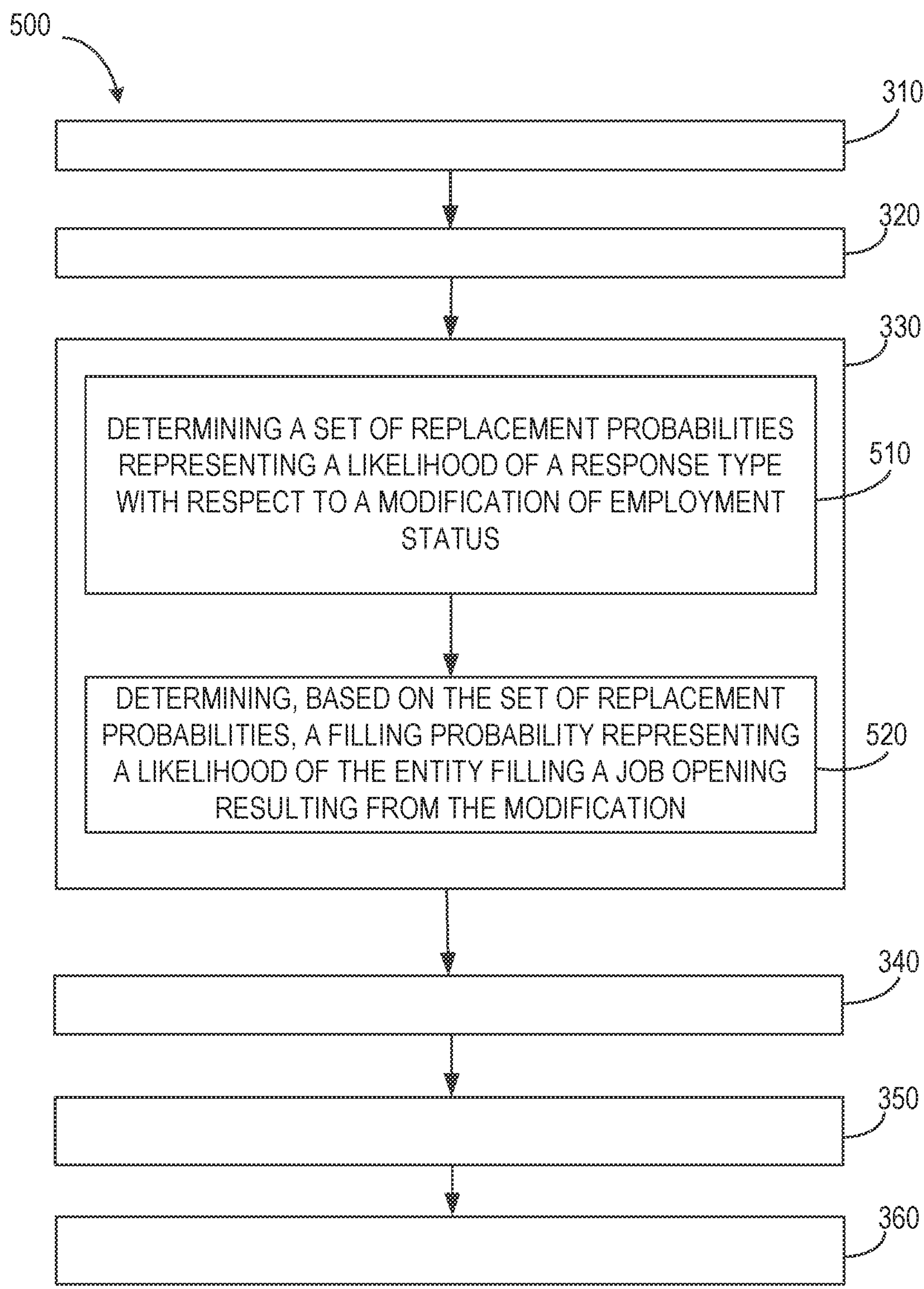
FIG. 5 is a flow diagram illustrating a method of analyzing a social network to predict member actions within the social networking system, according to some embodiments of the present disclosure.

FIG. 5 is a flow diagram illustrating an example method 500 of analyzing a social network to predict member actions within the social networking system 10, consistent with various embodiments described herein. The method 500 may be performed, at least in part, by, for example, the network analysis machine 22 illustrated in FIG. 2 (or an apparatus having similar components, such as one or more client devices 8 or application servers). In some embodiments, the method 500 is performed as a sub-operation or other part of the methods 300 or 400. As shown in FIG. 5, the method is performed as one or more sub-operations of method 300 in operation 330.

In operation 510, the probability component 230 determines a set of replacement probabilities. Each replacement probability represents a likelihood of a response type with respect to the modification of the employment status. In some embodiments, the set of replacement probabilities comprises a first probability, a second probability, and a third probability. The first probability is a growth probability indicating the entity is experiencing growth in a number of employees. The second probability is a transfer probability indicating a probability that the entity will fill the job opening internally. The third probability is a promotion probability indicating an employee within the entity will be promoted from a lower seniority level.

In some embodiments, the probability component 230 determines the first probability based on actions of the entity and members within the social networking system 10. The probability component 230 identifies a ratio of employees of the entity that are inbound versus outbound, a number and type of advertised job positions generated by the entity, and periphery data. Inbound employees comprise members of the social networking system 10 incorporating a position with the entity into a member profile within a period of time. Outbound employees comprise members of the social networking system 10 removing a position with the entity or changing an employment status to another entity in member profiles within a period of time. The number and type of advertised job postings distinguish the company that fails to hire by choice as opposed to as a response to an inability to hire. The periphery data comprises news articles, communication by entity representatives, and other information indicative of a health of the entity or hiring practices of the entity. The probability component 230 determines the second probability from a ratio of internal transfers versus hiring from outside of the entity. The probability component 230 may determine the ratio of internal transfers based on a number of employment status changes of members within the social networking system 10 changing from one job to another within the entity versus a number of employment status changes of members changing to the entity from another entity. The probability component 230 determines the third probability from the ratio of promotions of members versus hiring from outside of the entity. In some embodiments, the probability component 230 determines replacement probabilities for individual job functions, job titles, skills, and locations.

In operation 520, the probability component 230 determines a filling probability, based on the set of replacement probabilities. The filling probability represents a likelihood of the entity filling a job opening resulting from the modification of the employment status by the first member. In some embodiments, the probability component 230 determines the filling probability using Equation 2:

$$P(\text{hire})=\text{AVG}\ [qP(\text{growth}),rP(\text{transfer}),sP(\text{promotion})]$$

As shown in Equation 2, q, r, and s are weight values applied by the probability component 230. In some embodiments, the weight values vary between one and negative one. The weight values may comprise initial values modified by the probability component 230. In some instances, the initial value of q is proximate to one, the initial value of r is proximate to negative one, and the initial value of s is between zero and negative one. P(growth) represents the first probability, P(transfer) represents the second probability, and P(promotion) represents the third probability. The probability component 230 may average the sum of the first, second, and third probabilities to determine the filling probability.

Figure 6:
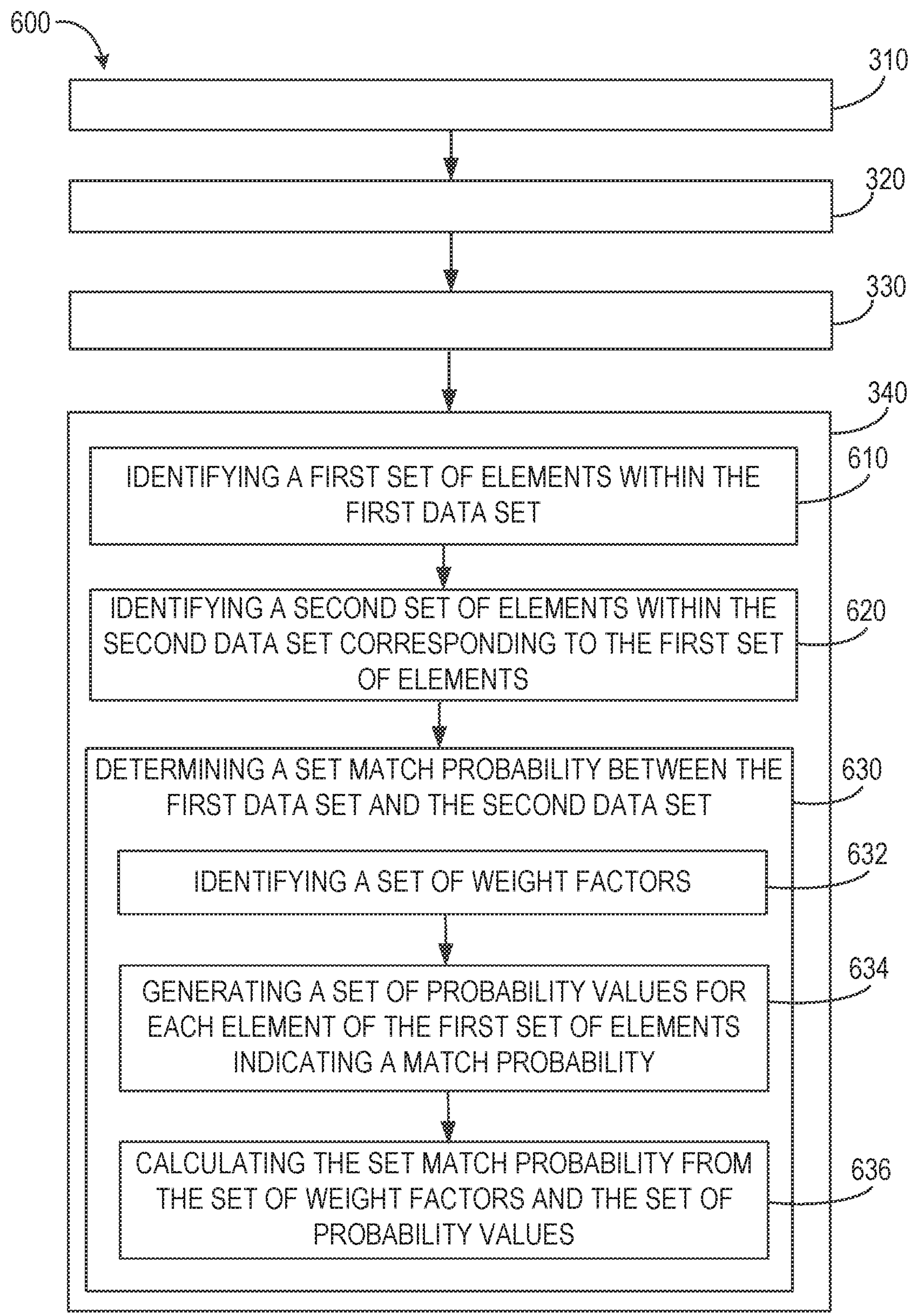
FIG. 6 is a flow diagram illustrating a method of analyzing a social network to predict member actions within the social networking system, according to some embodiments of the present disclosure.

FIG. 6 is a flow diagram illustrating an example method 600 of analyzing a social network to predict member actions within the social networking system 10, consistent with various embodiments described herein. The method 600 may be performed, at least in part, by, for example, the network analysis machine 22 illustrated in FIG. 2 (or an apparatus having similar components, such as one or more client devices 8 or application servers). In some embodiments, the method 600 includes one or more operations from the methods 300, 400, or 500. The operations of the method 600 may be performed during or as a set of sub-operations of operation 340.

In operation 610, the member component 240 identifies a first set of elements within the first data set. In some embodiments, the member component 240 identifies the first set of elements as one or more skills, qualifications, educational characteristics, and other information within the first data set associated with an employment position associated with the first employment status. In some instances, the member component 240 identifies the first set of elements from a position within the data table, such as data in one or more cells of the data table associated with the employment position. The member component 240 may identify the first set of elements from a semantic relationship between the current position and the first set of elements where the first set of elements are semantically related to the current position. In some embodiments, the member component 240 selects the first set of elements as elements within the first data set which occur within a data table of elements associated with a job title associated with the current position in the social networking system 10.

In operation 620, the member component 240 identifies a second set of elements within the second data set corresponding to the first set of elements. In some embodiments, the member component 240 identifies the second set of elements by determining one or more elements of the first set of elements which also occur in the second set of elements. In some embodiments, the member component 240 performs a semantic analysis of the first set of elements to determine one or more elements semantically similar to the elements comprising the first set of elements. The member component 240 then matches a portion of the first set of elements or the semantically similar elements to one or more elements of the second data set, selecting those one or more elements as the second set of elements.

In operation 630, the member component 240 determines a set match probability between the first data set and the second data set. The set match probability represents a similarity between the first data set and the second data set. In some instances, the set match probability is used to determine a likelihood that the second member would be interested in or a likely fit for the predicted job opening. The set match probability is determined by a set of probabilities determined for individual elements. In some embodiments, the set of probabilities comprises probabilities for title matches, job function matches, skills matches, industry matches, location matches, education matches, and interest matches. The set of probabilities may also comprise probability matches for interests, members the second member is following, memberships, and connections or other associations between members. In some instances, the set match probability is calculated using Equation 3:

$$P(\text{match})=\text{AVG}\ [aP(\text{title}),bP(\text{function},cP(\text{skills}),dP(\text{industry}),eP(\text{location}),fP(\text{field}),gP(\text{interest})]$$

In some embodiments, operation 630 comprises one or more sub-operations. As shown, in operation 632, the probability component 230 identifies a set of weight factors. Each weight factor corresponds to an element of the first set of elements. Each weight factor indicates a strength of association of the element with a position associated with the employment status. As provided in Equation 3, the set of weight factors comprises weight factors a, b, c, d, e, f and g. The weight factors indicate a strength of the associated probability in determining the set match probability. In some embodiments, the set of weight factors vary between one and negative one. Values for weight factors a-g may be iteratively modified by a machine learning algorithm in response to an accuracy value of one or more previous predictions.

In operation 634, the probability component 230 generates a set of probability values. Each probability value is generated for an element of the first set of elements and indicates a match probability between the element in the first data set and a corresponding element in the second data set. As shown in Equation 3, the set of probability values comprises P(title), P(function), P(skills), P(industry), P(location), P(field), and P(interest). The set of probabilities values correspond to at least a portion of the elements of the first data set and the second data set. As shown in Equation 3, the probability P(title) corresponds to title matches, the P(function) corresponds to job function matches, P(skills) corresponds to skills matches, P(industry) corresponds to industry matches, P(location) corresponds to geographical location matches, P(field) corresponds to field of study (e.g., education) matches, and P(interest) corresponds to interest matches.

In operation 636, the probability component 230 calculates the set match probability from the set of weight factors and the set of probability values. As shown in Equation 3, in some embodiments, the set match probability is calculated by averaging the sum of the probability values for P(title), P(function), P(skills), P(industry), P(location), P(field), and P(interest).

Figure 7:
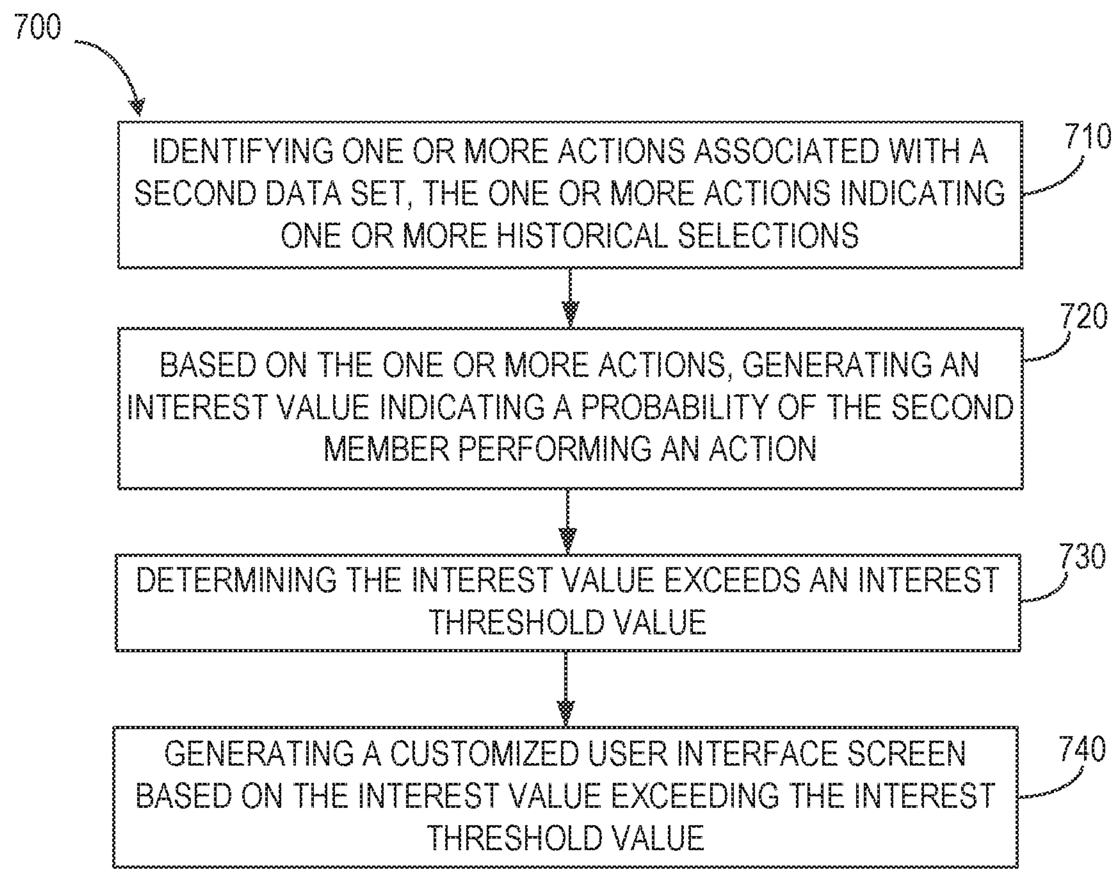
FIG. 7 is a flow diagram illustrating a model of analyzing a social network to predict member actions within the social networking system, according to some embodiments of the present disclosure.

FIG. 7 is a flow diagram illustrating an example method 700 of analyzing a social network to predict member actions within the social networking system 10, consistent with various embodiments described herein. The method 700 may be performed, at least in part, by, for example, the network analysis machine 22 illustrated in FIG. 2 (or an apparatus having similar components, such as one or more client devices 8 or application servers). In some embodiments, the method 700 includes one or more operations from the methods 300, 400, 500, or 600. In some embodiments, the operations of the method 700 are performed during or as a set of sub-operations of operation 340 and incorporate the operations of the method 600.

In operation 710, the action component 270 identifies one or more actions associated with the second data set. The one or more actions indicate one or more historical selections performed by the second member within the social networking system 10. In some embodiments, the one or more actions comprise actions relating to searching for a job. For example, the one or more actions comprise browsing for jobs on the social networking system 10, entering job search terms into the social networking system 10, selecting one or more links to job openings within the social networking system 10, selecting links for member profiles of one or more entities, and determining a delay in expected promotion for the second member. The action component 270 identifies the one or more actions by parsing an action history for the second data set. In some instances, the action history is stored in a data table linking specified actions with the second data set and a set of times at which actions were performed.

In operation 720, the probability component 230 generates an interest value based on the one or more actions. The interest value indicates a probability that the second member performs an action in response to being presented with one or more of a vacancy resulting from the change in employment status of the first member or generation of a job opening by the entity. In generating the interest value, the probability component 230 converts the one or more actions to numerical values. The probability component 230 processes the numerical values to generate the interest value. In some embodiments, the probability component generates the interest value using equations similar to or the same as those described above.

In operation 730, the probability component 230 determines that the interest value exceeds an interest threshold value. The interest threshold value may be a dynamic threshold or a predetermined threshold. In embodiments where the interest threshold value is a predetermined threshold, the probability component 230 determines that the interest value exceeds the interest threshold value by direct comparison of the interest value and the interest threshold value. Where the interest threshold value is a dynamic threshold, the probability component 230 determines the value for the interest value threshold prior to comparison of the interest value. The interest threshold value may be dynamically determined based on accuracy values of one or more previous predictions of actions of the second member responding to job openings.

In operation 740, the presentation component 260 generates a customized user interface screen based on the interest value exceeding the interest threshold value. The customized user interface comprises one or more of an indication of the entity (e.g., an entity identifier such as a name), a link to the member profile of the entity, and a job opening generated by the entity or associated with the member profile of the entity. In some embodiments, the customized user interface comprises the above-recited elements in addition to the elements described with respect to operation 360.

Figure 8:
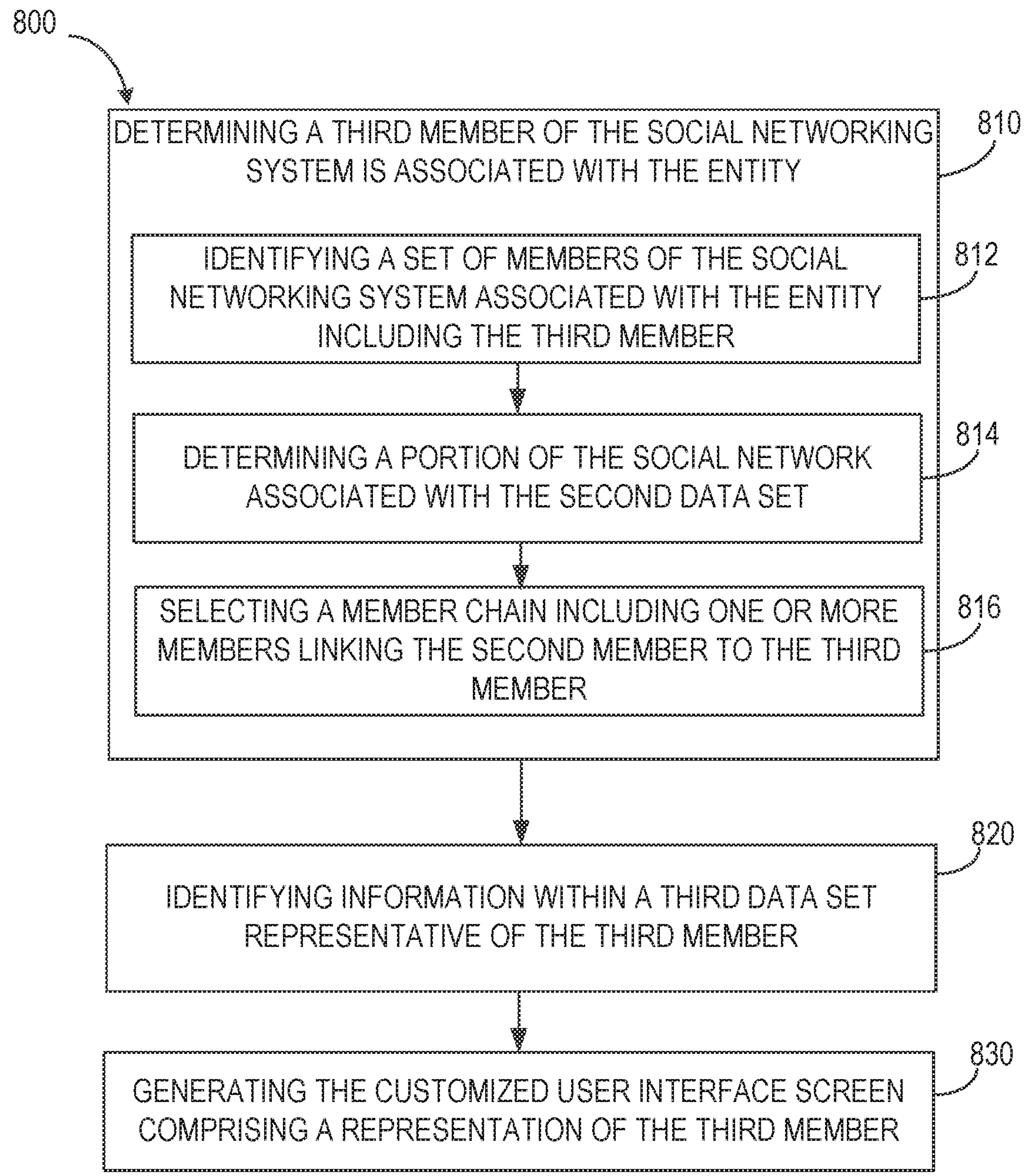
FIG. 8 is a flow diagram illustrating a model of analyzing a social network to predict member actions within the social networking system, according to some embodiments of the present disclosure.

FIG. 8 is a flow diagram illustrating an example method 800 of analyzing a social network to predict member actions within the social networking system 10, consistent with various embodiments described herein. The method 800 may be performed, at least in part, by, for example, the network analysis machine 22 illustrated in FIG. 2 (or an apparatus having similar components, such as one or more client devices 8 or application servers). In some embodiments, the method 800 includes one or more operations from the methods 300, 400, 500, 600, or 700. The operations of the method 800 may be performed during or as a set of sub-operations to one or more operations of the methods 300, 400, 500, 600, or 700.

In operation 810, the member component 240 determines that a third member of the social networking system is associated with the entity. In some embodiments, the member component 240 parses data sets associated with members connected to or otherwise affiliated with the entity to determine the third member. In some instances, the member component 240 performs semantic analysis on the data sets (e.g., member profiles) of the social networking system 10 to determine the third member. The member component 240 may also determine the third member in response to identifying connections between the entity, the third member, and the second member.

In operation 812, the member component 240 identifies a set of members of the social networking system 10 associated with the entity. The set of members includes the third member. In some embodiments, the member component 240 performs semantic analysis on the data sets associated with the set of members to identify an identification of the entity within the data sets (e.g., member profiles) of the set of members. In some instances, the member component 240 parses the data set (e.g., member profile) of the entity by identifying a data table of connections associated with the entity. The data table comprises a set of cells containing indicators, identifiers, or names of members of the social networking system 10 which are connected to or otherwise affiliated with the entity. The member component 240 parses the data table to identify the set of members associated with the social networking system 10.

In operation 814, the member component 240 determines a portion of the social network associated with the second data set. In some embodiments, the member component identifies a data table of member connections associated with the second data set. The data table of member connections comprises a set of cells containing indicators, identifiers, or names of members of the social networking system 10 which are connected to or otherwise affiliated with the second member or the second data set. The member component 240 parses the data table to identify a group or set of members (e.g., the portion of the social network) associated with or otherwise connected to the second data set.

In operation 816, the member component 240 selects a member chain including one or more members linking the second member to the third member. The member chain is selected based on the portion of the social network associated with the second data set and the set of members. In some instances, the member component 240 compares the set of members associated with the entity (e.g., a first set of members) and the set of members associated with the second data set (e.g., a second set of members) to select the member chain linking the second member to the third member. In some embodiments, the member chain comprises a direct link, which is a direct connection between the second member and the third member. The member chain may comprise a single link, which is a member of the second set of members who has a direct connection to one or more members of the first set of members. The member chain may comprise multiple links comprising a member of the second set of members who has an indirect connection to the third member (e.g., a member of the first set of members). In these instances, the indirect connection comprises one or more members of the social networking system 10 whose associations or connections link the member of the second set of members to the third member.

In operation 820, the element component 250 identifies information within a third data set representative of the third member. In some embodiments, the information comprises one or more of identification information, contact information, and interest information common to the third member and the second member. The element component 250 may identify the information as a name, an email address, a company contact link or email address, a message or mail link within the social networking system 10, a profile link of the member profile for the third member within the social networking system 10, or any other suitable contact information.

In operation 830, the presentation component 260 generates the customized user interface screen comprising a representation of the third member. In some embodiments, the representation of the third member comprises one or more of an identification (e.g., a name and picture) and a contact link (e.g., an email address, a telephone number, or a member profile link). Where the member chain between the second member and the third member includes one or more members of the social networking system 10, the customized user interface screen comprises a representation (e.g., identification and contact information) for at least one of the one or more members of the social networking system 10. In some embodiments, where the member chain includes more than one member of the social networking system 10, the customized user interface screen comprises contact information of at least one of the one or more members within the member chain, an identifier of the third member, and an indication of the association between the at least one member and the third member. In these instances, the customized user interface screen enables connection between the second member and the at least one member to facilitate an introduction of the second member to the third member by the at least one member of the member chain, without directly revealing the contact information of the third member to the second member. In some embodiments, the customized user interface screen comprises at least a portion of the customized user interface screens described above with respect to operations 360 and 740.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented components or objects that operate to perform one or more operations or functions. The components and objects referred to herein may, in some example embodiments, comprise processor-implemented components and/or objects.

Similarly, the methods described herein may be at least partially processor-implemented. For example, at least some of the operations of a method may be performed by one or more processors or processor-implemented components. The performance of certain operations may be distributed among the one or more processors, not only residing within a single machine or computer, but deployed across a number of machines or computers. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 9:
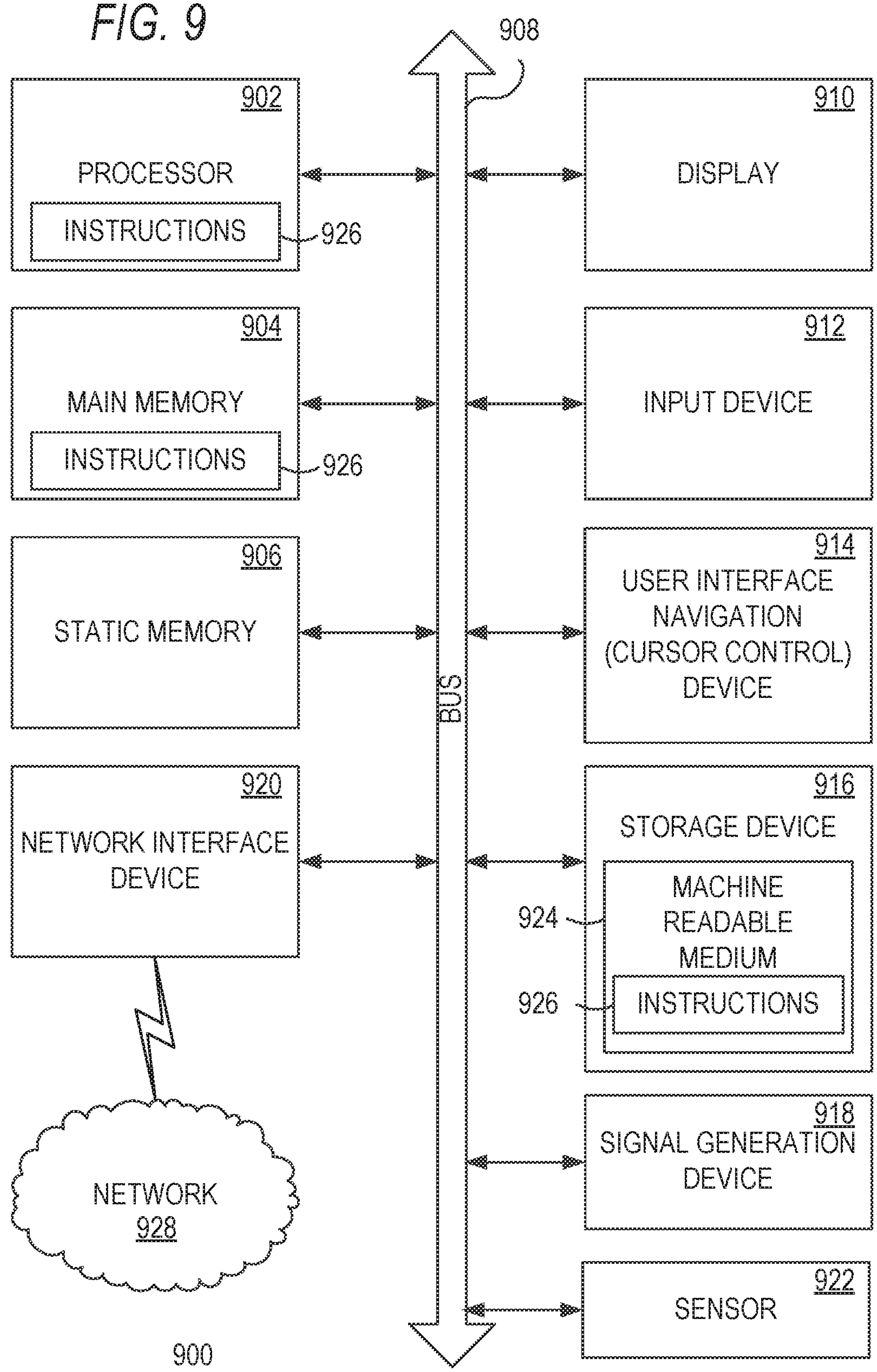
FIG. 9 is a block diagram of a machine in the form of a computing device within which a set of instructions, for causing the machine to perform any one or more of the methodologies discussed herein, may be executed.

FIG. 9 is a block diagram of a machine in the form of a computer system 900 within which a set of instructions, for causing the machine to perform any one or more of the methodologies discussed herein, may be executed. For example, the computer system 900 may be a server functioning as the network analysis machine 22. In some instances, the computer system 900 may be a set of similar computing devices storing instructions capable of configuring a processor of the computer system 900 as one or more of the components (hardware-software implemented components) described above. The configuration of a component, even for a period of time, causes the computer system 900 to act as a special-purpose computing device for performing one or more operations associated with the component, as described in the present disclosure. In some embodiments, the computer system 900 may function as the social networking system 10 with portions (e.g., hardware and instructions) partitioned to function as one or more of the components, interfaces, or systems described above during specified operations associated with those aspects of the components, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a various embodiments, the machine may be a server computer; however, in alternative embodiments, the machine may be a personal computer (PC), a tablet PC, a set-top box (STB), a personal digital assistant (PDA), a mobile telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processor 902 (e.g., a central processing unit (CPU), a graphics processing unit (GPU), or both), a main memory 904, and a static memory 906, which communicate with each other via a bus 908. The computer system 900 may further include a display unit 910, an alphanumeric input device 912 (e.g., a keyboard), and a user interface navigation device 914 (e.g., a mouse). In one embodiment, the display unit 910, alphanumeric input device 912, and UI navigation device 914 are a touch screen display. The computer system 900 may additionally include a storage device 916 (e.g., drive unit), a signal generation device 918 (e.g., a speaker), a network interface device 920, and one or more sensors 922, such as a global positioning system sensor, compass, accelerometer, or other sensor.

The storage device 916 includes a machine-readable medium 924 on which is stored one or more sets of instructions 926 and data structures embodying or utilized by any one or more of the methodologies or functions described herein. The instructions 926 (e.g., processor-executable instructions) may also reside, completely or at least partially, within the main memory 904 (e.g., non-transitory machine-readable storage medium) and/or within the processor 902 during execution thereof by the computer system 900, with the main memory 904 and the processor 902 also constituting machine-readable media 924.

While the machine-readable medium 924 is illustrated in an example embodiment to be a single medium, the term "machine-readable medium" may include a single medium or multiple media (e.g., a centralized or distributed database, and/or associated caches and servers) that store the one or more instructions 926. The term "machine-readable medium" shall also be taken to include any tangible medium that is capable of storing, encoding, or carrying the instructions 926 for execution by the machine and that cause the machine to perform any one or more of the methodologies of the present disclosure, or that is capable of storing, encoding, or carrying data structures utilized by or associated with such instructions 926. The term "machine-readable medium" shall accordingly be taken to include, but not be limited to, solid-state memories, and optical and magnetic media. Specific examples of machine-readable media 924 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disk read only memory (CD-ROM) and digital video disk read only memory (DVD-ROM) disks.

The instructions 926 may further be transmitted or received over a communication network 928 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi® and WiMax® networks). The term "transmission medium" shall be taken to include any intangible medium that is capable of storing, encoding, or carrying the instructions 926 for execution by the machine, and includes digital or analog communications signals or other intangible media to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising: detecting a change in a first member profile in a social networking system, the change in the first member profile comprising a modification of an employment status of a first member associated with the first member profile from a first employment status to a second employment status;

identifying an entity associated with the first employment status, the entity being an organization at which the first member was previously employed;

in response to the change from the first employment status to the second employment status of the first member, determining a set of employment probabilities, each employment probability representing a likelihood of a specified cause of the modification of the employment status, the set of employment probabilities including:

a first probability representing the likelihood that the first member left the entity for a new employer, and a second probability representing the likelihood that the first member left a current position for a new position within the entity;

using the set of employment probabilities, determining an opening probability of the entity, wherein the opening probability of the entity relates to a prediction that the entity will generate a job opening for a job position vacated by the first member when the opening probability exceeds a threshold, per the modification of the employment status of the first member, the opening probability based, in part, on information indicating the number of hires and departures at the entity over a given period of time, as indicated in member profiles of members of the social networking system;

identifying a second member profile associated with a second member of the social networking system, the second member profile having at least one common element with the first member profile; and identifying a set of elements within the first member profile and an entity profile, associated with the entity, corresponding to the first employment status; and generating instructions for presenting a customized user interface screen, at a client device associated with the second member, comprising a representation of the entity and a portion of the set of elements.

2. The method of claim 1, wherein determining the set of employment probabilities includes determining a third probability representing a likelihood that the first member was promoted in the same position with the entity.

3. The method of claim 1, wherein determining the opening probability further comprises:

determining a set of replacement probabilities, each replacement probability representing a likelihood of a response type with respect to the modification of the employment status; and determining, based on the set of replacement probabilities, a filling probability representing a likelihood of the entity filling a job opening resulting from the modification of the employment status by the first member.

4. The method of claim 1, wherein identifying the second member profile associated with the second member further comprises:

identifying a first set of elements within the first member profile;

identifying a second set of elements within the second member profile corresponding to the first set of elements; and determining a set match probability between the first member profile and the second member profile.

5. The method of claim 4, wherein determining the set match probability further comprises:

identifying a set of weight factors, each weight factor corresponding to an element of the first set of elements and indicating a strength of association of the element to a position associated with the employment status;

generating a set of probability values, each probability value generated for an element of the first set of elements and indicating a match probability between the element in the first member profile and a corresponding element in the second member profile; and calculating the set match probability from the set of weight factors and the set of probability values.

6. The method of claim 4, further comprising:

identifying one or more actions associated with the second member profile, the one or more actions indicating one or more historical selections performed by the second member within the social networking system; and based on the one or more actions, generating an interest value indicating a probability of the second member performing an action;

determining the interest value exceeds an interest threshold value; and generating the instructions for presenting the customized user interface screen based on the interest value exceeding the interest threshold value.

7. The method of claim 1, wherein generating the instructions for presenting the customized user interface screen further comprises:

determining a third member of the social networking system associated with the entity;

identifying information within a third member profile representative of the third member; and generating the instructions for presenting the customized user interface screen, the user interface screen comprising a representation of the third member.

8. The method of claim 7, wherein determining the third member of the social networking system further comprises:

identifying a set of members of the social network associated with the entity, the set of members including the third member;

determining a portion of the social network associated with the second member profile; and selecting a member chain including one or more members linking the second member to the third member, based on the portion of the social network associated with the second member profile and the set of members.

9. A system comprising:

one or more processors; and a processor-readable storage device comprising processor executable instructions that, when executed by one or more processors of a machine, cause the machine to perform operations comprising:

detecting a change in a first member profile in a social networking system, the change in the first member profile comprising a modification of an employment status of a first member associated with the first member profile from a first employment status to a second employment status;

identifying an entity associated with the first employment status, the entity being an organization at which the first member currently is, or previously was, employed;

in response to the change from the first employment status to the second employment status of the first member, determining a set of employment probabilities, each employment probability representing a likelihood of a specified cause of the modification of the employment status, the set of employment probabilities including:

a first probability representing the likelihood that the first member left the entity for a new employer, and a second probability representing the likelihood that the first member left a current position for a new position within the entity;

using the set of employment probabilities, determining an action probability of the entity, wherein the action probability of the entity relates to a prediction of whether the entity will, or will not, generate a job opening for a job position vacated by the first member, per the modification of the employment status of the first member, the action probability based in part on information indicating the ratio of hires to departures at the entity over a given period of time, as indicated in member profiles of members of the social networking system, and a number of active job postings of the entity;

identifying a second member profile associated with a second member of the social networking system, the second member profile having at least one common element with the first member profile; and identifying a set of elements within the first member profile and an entity profile, associated with the entity, corresponding to the first employment status; and generating instructions for presenting a customized user interface screen, at a client device associated with the second member, comprising a representation of the entity and a portion of the set of elements.

10. The system of claim 9, wherein determining the set of employment probabilities includes determining a third probability representing a likelihood that the first member was promoted in the same position with the entity.

11. The system of claim 9, wherein determining the opening probability further comprises:

determining a set of replacement probabilities, each replacement probability representing a likelihood of a response type with respect to the modification of the employment status; and determining, based on the set of replacement probabilities, a filling probability representing a likelihood of the entity filling a job opening resulting from the modification of the employment status by the first member.

12. The system of claim 9, wherein identifying the second member profile associated with the second member further comprises:

identifying a first set of elements within the first member profile;

identifying a second set of elements within the second member profile corresponding to the first set of elements; and determining a set match probability between the first member profile and the second member profile.

13. The system of claim 12, wherein determining the set match probability further comprises:

identifying a set of weight factors, each weight factor corresponding to an element of the first set of elements and indicating a strength of association of the element to a position associated with the employment status;

generating a set of probability values, each probability value generated for an element of the first set of elements and indicating a match probability between the element in the first member profile and a corresponding element in the second member profile; and calculating the set match probability from the set of weight factors and the set of probability values.

14. The system of claim 12, wherein the operations further comprise:

identifying one or more actions associated with the second member profile, the one or more actions indicating one or more historical selections performed by the second member within the social networking system; and based on the one or more actions, generating an interest value indicating a probability of the second member performing an action;

determining the interest value exceeds an interest threshold value; and generating the instructions for presenting the customized user interface screen based on the interest value exceeding the interest threshold value.

15. A processor-readable storage device comprising processor executable instructions that, when executed by one or more processors of a machine, cause the machine to perform operations comprising:

detecting a change in a first member profile in a social networking system, the change in the first member profile comprising a modification of an employment status of a first member associated with the first member profile from a first employment status to a second employment status;

identifying an entity associated with the first employment status, the entity being an organization at which the first member was previously employed;

in response to the change from the first employment status to the second employment status of the first member, determining a set of employment probabilities, each employment probability representing a likelihood of a specified cause of the modification of the employment status, the set of employment probabilities including:

a first probability representing the likelihood that the first member left the entity for a new employer, and a second probability representing the likelihood that the first member left a current position for a new position within the entity;

using the set of employment probabilities, determining an action probability of the entity, wherein the action probability of the entity relates to a prediction of whether the entity will, or will not, have a job opening for a job position vacated by the first member, per the modification of the employment status of the first member, the action probability based in part on information indicating the number of hires and departures at the entity over a given period of time, as indicated in member profiles of members of the social networking system, and the number of active job listings of the entity;

identifying a second member profile associated with a second member of the social networking system, the second member profile having at least one common element with the first member profile; and identifying a set of elements within the first member profile and an entity profile, associated with the entity, corresponding to the first employment status; and generating instructions for presenting a customized user interface screen, at a client device associated with the second member, comprising a representation of the entity and a portion of the set of elements.

16. The processor-readable storage device of claim 15, wherein determining the set of employment probabilities includes determining a third probability representing a likelihood that the first member was promoted in the same position with the entity.

17. The processor-readable storage device of claim 15, wherein determining the action probability further comprises:

determining a set of replacement probabilities, each replacement probability representing a likelihood of a response type with respect to the modification of the employment status; and determining, based on the set of replacement probabilities, a filling probability representing a likelihood of the entity filling a job opening resulting from the modification of the employment status by the first member.

18. The processor-readable storage device of claim 15, wherein identifying the second member profile associated with the second member further comprises:

identifying a first set of elements within the first member profile;

identifying a second set of elements within the second member profile corresponding to the first set of elements; and determining a set match probability between the first member profile and the second member profile.

19. The processor-readable storage device of claim 18 wherein determining the set match probability further comprises:

identifying a set of weight factors, each weight factor corresponding to an element of the first set of elements and indicating a strength of association of the element to a position associated with the employment status;

generating a set of probability values, each probability value generated for an element of the first set of elements and indicating a match probability between the element in the first member profile and a corresponding element in the second member profile; and calculating the set match probability from the set of weight factors and the set of probability values.

20. The processor-readable storage device of claim 18, wherein the operations further comprise:

identifying one or more actions associated with the second member profile, the one or more actions indicating one or more historical selections performed by the second member within the social networking system; and based on the one or more actions, generating an interest value indicating a probability of the second member performing an action;

determining the interest value exceeds an interest threshold value; and generating the instructions for presenting the customized user interface screen based on the interest value exceeding the interest threshold value.

* * * * *